United States Patent [19]
Chihoski et al.

[11] 4,028,522
[45] June 7, 1977

[54] MULTI-MODE STRUCTURAL WELD MONITOR ON A TIME BASE

[75] Inventors: Russell Alexander Chihoski; John Charles De Fellippie, both of Littleton, Colo.

[73] Assignee: Martin Marietta Corporation, Rockville, Md.

[22] Filed: Apr. 29, 1975

[21] Appl. No.: 572,768

[52] U.S. Cl. .............................. 219/109; 219/117 R
[51] Int. Cl.[2] ........................................ B23K 11/24
[58] Field of Search ............ 219/108, 109, 110, 91, 219/100; 328/114, 132, 151; 324/175, 178

[56] References Cited
UNITED STATES PATENTS

| | | | |
|---|---|---|---|
| 3,400,242 | 9/1968 | Waller | 219/110 |
| 3,404,252 | 10/1968 | Michael | 219/110 |
| 3,417,221 | 12/1968 | Hayward | 219/109 |
| 3,443,056 | 5/1969 | Ramaley et al. | 219/109 |
| 3,585,347 | 6/1971 | Needham et al. | 219/110 |
| 3,609,285 | 9/1971 | Scarpelli et al. | 219/109 |
| 3,708,648 | 1/1973 | Croucher et al. | 219/109 |
| 3,711,779 | 1/1973 | Allington | 328/114 |

Primary Examiner—Bruce A. Reynolds
Assistant Examiner—Clifford C. Shaw
Attorney, Agent, or Firm—Sughrue, Rothwell, Mion, Zinn & Macpeak

[57] ABSTRACT

To provide a plurality of different weld quality indicators in resistance, projection and forge welding, the varying separation of two electrodes during a plurality of different time brackets defined within a weld cycle is measured. At least one interval timer is used to define such time brackets. These weld quality indicators include the surface resistance of the workpieces, the melting rate, the maximum expansion, the expansion rate, the weld size, the forge force, the set-down rate, etc.

10 Claims, 4 Drawing Figures

MULTI-MODE STRUCTURAL WELD MONITOR ON A TIME BASE

BACKGROUND OF THE INVENTION

1. Field of the Invention

The present invention relates to a welding apparatus and more particularly to a monitoring system for measuring and recording a plurality of weld quality indicators.

2. Description of the Prior Art

A recurring problem in the welding art is control of a welding machine such that it provides welds of consistently high quality. Such welds are difficult to obtain because of numerous invisible and varying factors, such as the characteristic of the workpiece upon which welding is to be carried out, the condition of the welding electrodes, and fluctuations in welding current and electrode pressure. Therefore, it is necessary to test or monitor the welds in order to be assured that they meet certain standards of quality.

Non-destructive weld monitoring systems for monitoring the welding process of each weld and providing an instantaneous indication of weld quality are well known. A typical arrangement is disclosed in U.S. Pat. No. 3,708,648, granted to William C. Croucher et al., on Jan. 2, 1973, and assigned to the assignee of the present invention. In the Croucher et al. arrangement, a differential transformer is used to sense the linear movement of an extendable welding electrode, which movement is caused by the expansion, melting, and solidification of the weld in the workpiece which is gripped between the extendable electrode and a fixed electrode. First, the output of the differential transformer is sensed after the electrodes have been placed in operable relation with the workpiece, but prior to the beginning of a weld cycle. Second, the output of the transformer is sensed when a predetermined condition, such as maximum expansion, has been detected. By subtracting the first output value from the second output value, one can determine the travel of the extendable electrode relative to the position of the electrodes at the start of the weld cycle.

The Croucher et al. apparatus description employs electromechanical devices, relays, etc., to illustrate the sequence logic, although it was made clear that solid state switching is an alternative method for accomplishing the above. This device is limited because it stores and makes use of maximum values of electrode movement from null.

Other expansion using devices employ electromechanical sensors, geared electrical keys or clutches, which are used to preset a predetermined height so that the time to move from a zero point to the prescribed height is measured and used. The disadvantage inherent in these devices is the inaccuracy of the electromechanical systems especially with regard to quickly welded alloys, like aluminum, and the lack of versatility being only able to tell the time of a rise to one point on the rise slope.

SUMMARY OF THE INVENTION

These and other disadvantages of known prior art arrangements are overcome by the present invention which provides a novel spotweld or seamweld monitor which can measure the varying separation of welder electrodes during one or each of a plurality of consecutive, overlapping, or separated, time brackets specified or set up for a typical weld cycle. In the simplest form, at least one timer is used to define such time brackets. The initial workpiece surface resistance, which affects the quality of the final weld, is indicated by measuring the rate of electrode separation during a time bracket defined in the initial portion of the weld cycle. The rate of electrode separation during a second, later time bracket following the first one represents the metal melting rate which provides data related primarily to metal section resistance and current intensity. The maximum workpiece expansion and the net rate of expansion are determined based on the electrode displacement which takes place between application and termination of welding current, that is, during a preset weld current time. Further, the rate at which the electrodes return towards each other after the welding current is cut off is an indication of the magnitude of forge force and post weld current.

In other words, whereas in the prior art the spotweld rise-rate of expansion was determined by measuring the time between predetermined geometric points of the spotweld expansion, in the present invention the spotweld rise-rate and peak expansion are measured by determining the electrode separation at prescribed points of time during the welding cycle. This results in a widely versatile instrument measuring many points during the evolution of a weld and a construction that is free of electromechanical and mechanical articulating devices.

DETAILED DESCRIPTION OF THE PREFERRED EMBODIMENT

The instant invention provides a spotweld monitoring system for measuring and recording the quality of spotwelds made by conventional welding machines. A conventional welding machine is diagrammatically illustrated in FIG. 1. It should be understood that the representation of the spotwelder is for explanatory purposes only, and the structure shown is not intended to be limiting upon the specific invention. It will be further understood by those skilled in the art that any of the many conventional spotwelding machines may be used with the monitoring system disclosed hereinbelow.

Figure 2:
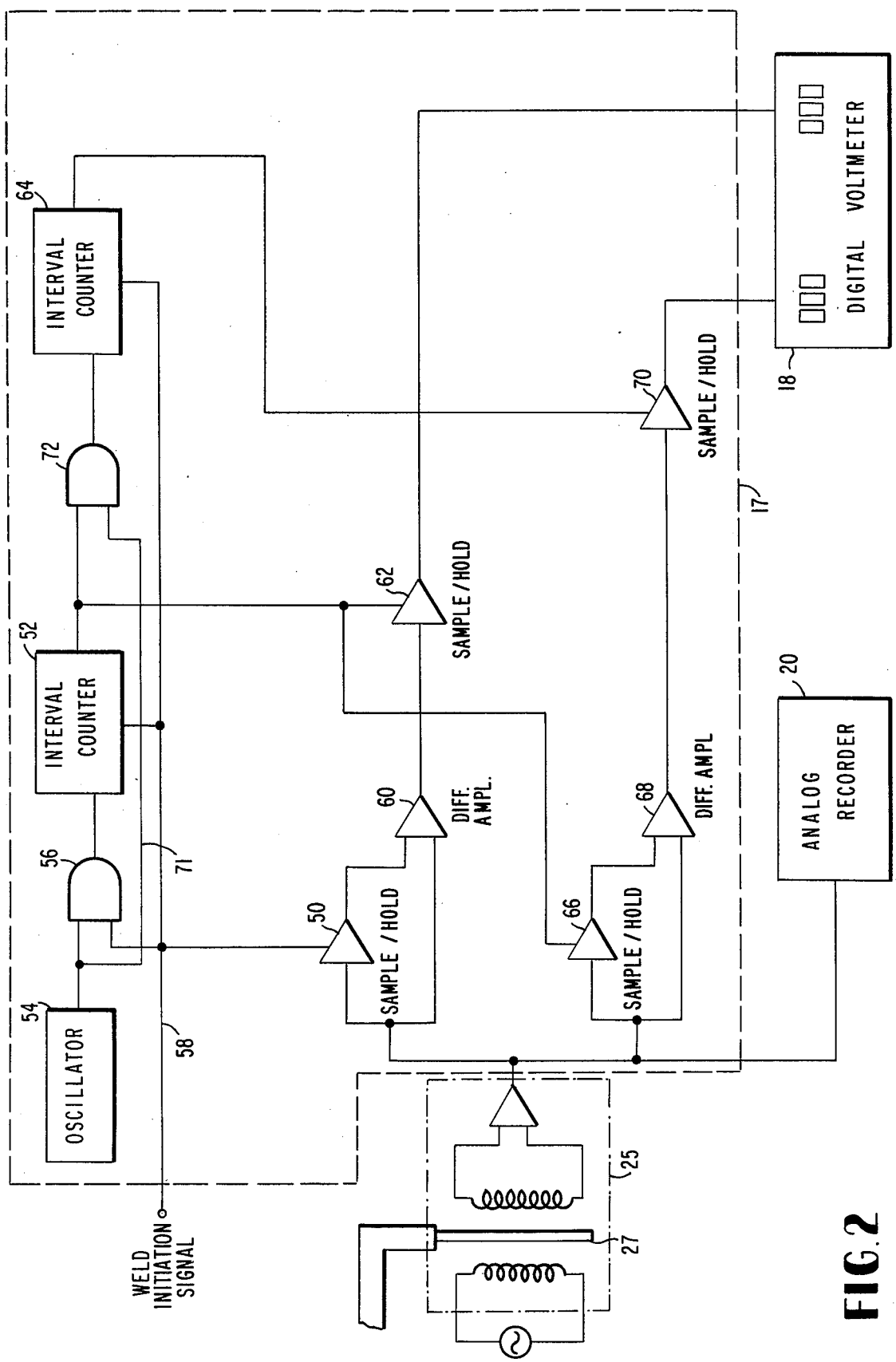
FIG. 2 illustrates, in schematic form, the circuitry of the weld monitor of the present invention.

The workpiece which includes pieces 10 and 11 is pressed between electrodes 12 and 13. The extendable electrode 13 is attached to a suitably insulated movable support ram 14 which is vertically positionable by a conventional piston and cylinder assembly 14a, and which is electrically coupled to welding transformers (not shown) by a conductive link 15. The monitor of this invention, which will be described in more detail with reference to FIG. 2, is shown generally at 17. Values of the weld quality indicators are provided by voltages which may be measured and presented by a digital voltmeter 18 with a display and/or printer and by an analog recorder 20 coupled to the monitoring circuitry through buses 22 and 23, respectively. The measurement and presentation of data supplied by the weld monitor can be supplied by a variety of generally known devices, and the two illustrated are only exemplary.

Figure 1:
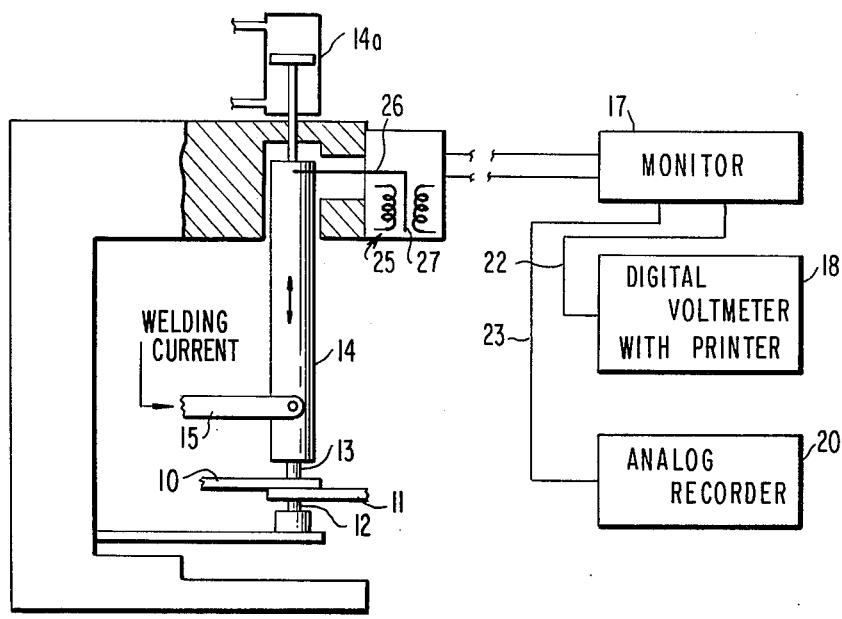
FIG. 1 is a diagram of a conventional welder showing its relationship to the monitor of this invention.

Monitor 17 automatically compensates for electrode wear and workpiece thickness variations by electronic means, such as a differential or displacement transformer shown schematically in FIG. 1 at 25 and a nulling system including sample/hold amplifiers. Such transformers are conventional. An example of a differential transformer which can be used with the monitoring system of this invention is the DCDT series Displacement Transducer, manufactured and sold by the Hewlett-Packard Company. In operation, the transformer 25 reflects the movement of electrode 13 through linkage 26 coupled to transformer core 27. The movement of the core 27 is congruent to the movement of electrode 13. Since the output of the transformer can be correlated to the position of movable core 27, the output of the transformer can be correlated to the movement of electrode 13.

Operation of the monitor of this invention will be described with reference to FIGS. 3A and 3B. The detailed circuitry of the monitor is illustrated in FIG. 2. The section of this circuitry designated generally by the numeral 17 corresponds to the circuitry enclosed in block 17 of FIG. 1.

The circuitry shown has the capability of accurately measuring several parameters which are related to the quality of spotwelds produced between two pieces of metal. As with the monitoring system of U.S. Pat. No. 3,708,648, the present invention provides an analog trace of the expansion and contraction of the weld in the workpiece as the spotweld is being produced. In addition, the invention has the capability of providing a measurement of the maximum workpiece expansion and the rate of expansion, as well as the rate of setdown and the distance between the maximum expansion point and the set-down point. Further, the device can provide a measurement representing the workpiece surface resistance, the melting rate and the forge force.

Figure 3A:
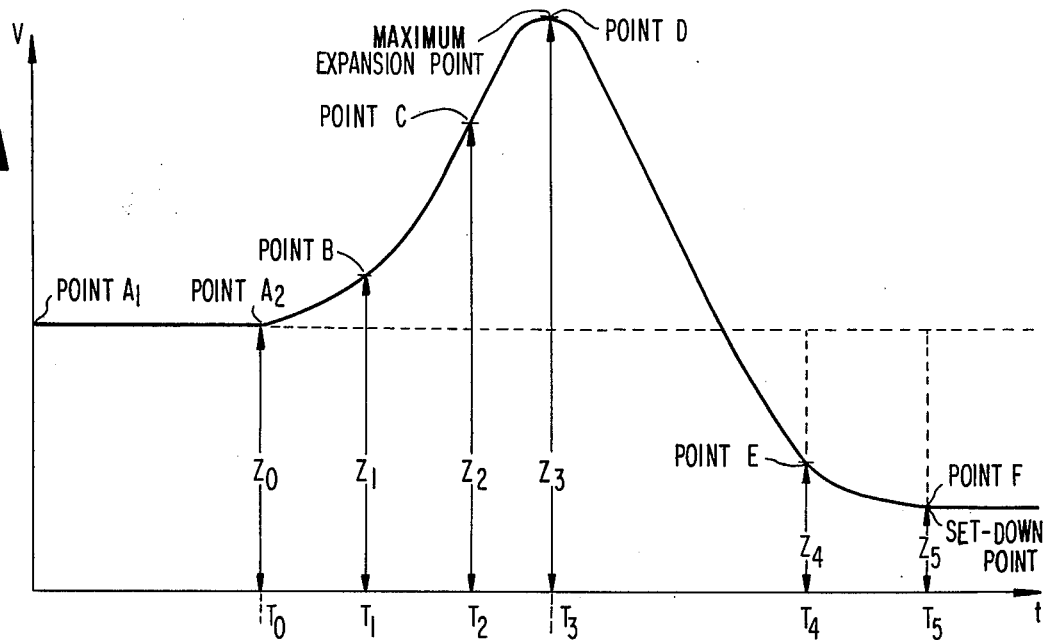
FIG. 3A is a graph showing the movement of the extendable electrode with respect to time in terms of the output of the differential transformer.
Figure 3B:
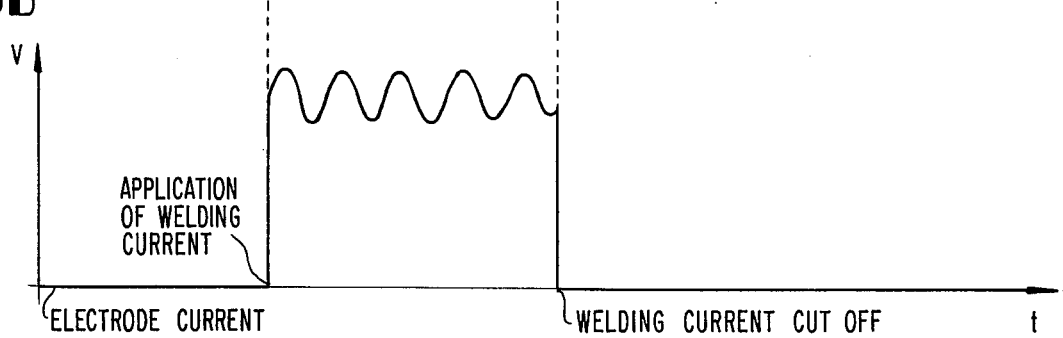
FIG. 3B is a graph of one typical electrode voltage versus time.

FIG. 3A is a trace of the output of the differential transformer as recorded by analog recorder 20 with the ordinate representing a potential V proportional to the separation Z between the welder electrodes and the abscissa representing time. When the workpiece is placed in the welder, the extendable electrode is moved down into contact with the workpiece. When contact occurs, the output of the transformer is as illustrated at point $A_1$. At the null point $A_2$ the welding cycle is commenced by supplying welding current to electrodes 12 and 13, as shown in FIG. 3B. This is the start time which will be called $T_0$. As the workpiece expands under the influence of the welding current, electrode 13 moves away from the fixed electrode 12 to a position corresponding to point B and then to that corresponding to point C. The separation of the electrodes along their axis will be herein called Z for convenience. Application of welding power continues until electrode 13 has reached a position corresponding to the maximum expansion point D. When welding power is cut off, the workpiece now begins to solidify, and electrode 13 moves down toward electrode 12. Electrode 13 returns through the null point and moves to a position corresponding to point E. At the end of the welding cycle, electrode 13 ultimately reaches a position corresponding to the set-down point F so that the value of Z is usually less after the weld cycle than before.

The monitor of the present invention can isolate a singular logic that identifies the rate and/or the increment of workpiece expansion in any segment of the trace shown in FIG. 3A, by first allowing the selection of a time interval at any position on the trace such as $\Delta T_{1-2}$ (between $T_1$ and $T_2$), then storing a value for electrode separation $Z_1$ at time $T_1$, and then for $Z_2$ at time $T_2$, and making available the difference $\Delta Z_{1-2}$. Thus, for any given segment of the trace, values for the $\Delta Z$ and the quotient $\Delta Z/\Delta T$, or time rate of change of the expansion, on each weld are available for presentation.

In the expanding part of the weld, the value of the rise rate $\Delta Z/\Delta T$ provided by the monitor is an indication of (1) the surface resistance at the interface of the workpieces, (2) the melting rate, (3) the maximum expansion, and (4) some other unspecified properties of the materials or processes. The interface or surface resistance, an important factor in the control of weld size or quality for consistency of end results, is determined by measuring the rise rate at the earliest part of the weld cycle. This is the separation which is characterized in FIG. 3A by the rise $Z_1 - Z_0$ in the first time interval $T_1 - T_0$. In a like manner, the rise rate $$\frac{Z_2 - Z_1}{T_2 - T_1}$$

in the next phase of the trace is determinable and provides information related to the metal section resistance and weld current density. The maximum weld expansion is related to the weld size and is most easily determined by the difference $Z_3 - Z_0$, because the end of the specified time $T_3$ in FIG. 3A can be made to correspond to the end of weld current by selecting the same time. The $\Delta Z$ in the interval from $T_3$ to $T_4$ during which the electrodes approach one another, provides a value giving information on forge force and post weld current.

The distance between the null point A, and the set-down point F obtained at the end of the welding cycle, that is, the difference $Z_0 - Z_5$, represents the depth of an indentation formed on the workpiece surface, as is found by comparing the separation measurement at time $T_0$ with that at any extended time such as time $T_5$.

Turning now to the description of operation of the circuitry of FIG. 2, the differential transformer 25 provides at its output a potential proportional to the initial separation $Z_0$ between electrodes at the start of a welding cycle at $T_0$. A sample/hold amplifier 50 is provided to respond to the differential transformer output, $Z_0$ (the electrode separation at $T_0$), and is maintained in the sample mode prior to application of welding power. Such sample/hold amplifiers are conventional. In order to determine the value of electrode separation, $\Delta Z$, between points $A_2$ and B, an interval counter 52 is preset to a selected time interval, such as from $T_0$ to $T_1$. Counter 52 is a conventional interval counter responsive to clock pulses supplied from an oscillator 54 through an AND gate 56. AND gate 56 is enabled in response to a weld initiation signal present on a line 58 during the passage of the welding current. The detection of the weld initiation signal by AND gate 56 will start the counting sequence of counter 52 from the preset count to zero count. The weld initiation signal is also applied to the amplifier 50 to switch it to the hold mode at the moment of the start of a welding cycle, i.e., at time $T_0$. Thus, the output of amplifier 50 acts as a reference level for the weld quality measurements. That is, the output of amplifier 50 provides a reference voltage against which the output of the differential transformer 25 will be compared.

As the welding current is applied to the electrodes, the weld area inside the workpiece begins to expand, causing the extendable electrode 13 to travel away from the fixed electrode 12. This movement causes an increase in the output voltage from the differential transformer 25. A differential amplifier 60 operates to compare the output of differential transformer 25 with the output of amplifier 50 to provide an output voltage equal to the difference therebetween. The output of the differential amplifier 60 is coupled to one input of the digital voltmeter 18 through the second sample/hold amplifier 62 which is normally held in the sample mode. The amplifier 62 is adapted to be responsive to the output of counter 52 so as to be placed into the hold mode at count zero of the counter 52. The voltmeter 18 is also enabled at count zero of the counter 52 to provide a digital readout of the output from the amplifier 62, which output is proportional to the change in electrode separation occurring during the predetermined time interval $T_0 - T_1$, that is, the $\Delta Z$ between points $A_2$ and B. The voltmeter 18 also produces a digital display and creates a coded signal of the output of amplifier 62 at $T_1$, which may be used to operate other devices such as recorders, data processors, or feedback systems. The voltage displayed on the digital voltmeter 18 is an indication of the workpiece surface resistance when the time interval $T_0 - T_1$ is kept constant.

In an added mode of operation, the distance $Z_2 - Z_1$ between points B and C is determined. Another interval counter 64 is preset to a value corresponding to a predetermined time interval $T_1 - T_2$ which is the time it would take for the movable electrode to move from point B to point C. At the instant when the movable electrode reaches point B, the output of the counter 52 has descended to a zero count and is supplied to an amplifier 66, also of the sample/hold type, placing it into the hold mode. The output of amplifier 66 is used as a baseline to a differential amplifier 68; that is, the voltage (representing $Z_1$) appearing at the output of amplifier 66 represents the height of point B on the graph of FIG. 3A. The counter 64 as well as the counter 52 is supplied at its reset input with the weld initiation signal.

In response to the counter 52 defining a zero count, an AND gate 72 is enabled to allow the passage of clock pulses from the oscillator 54 to the counter 64 through a line 71, thereby starting the counting sequence at counter 64. The operation of the differential amplifier 68 is identical to that previously described with respect to the differential amplifier 60. The output of differential amplifier 68 is coupled to a second input of the digital voltmeter 18 through an amplifier 70 which is also of the sample/hold type.

The counter 64 controls the operation of amplifier 70. The amplifier 70 is placed into the hold mode when counter 64 defines a zero count. Since counter 64 was preset to the value corresponding to the time interval $T_1 - T_2$, the output of amplifier 70 after it is placed into the hold mode represents the Z distance between points B and C, that is $Z_2 - Z_1$. At count zero of the counter 64, the digital voltmeter 18 also provides a digital indication of the output of amplifier 70. In addition, a digital presentation is obtained of that output from the digital voltmeter 18. This output is an indication of the melting rate which is believed to be substantially proportional to the metal section resistance or current intensity. It should be noted that the analog recorder 20 connected to the monitor 17 will receive a signal representative of electrode separation to produce a trace similar to that shown in FIG. 3A, which displays nugget size change always with reference to one reference baseline.

The expansion of the workpiece continues until the termination of welding power. That is, the maximum expansion point D takes place when the welding power is cut off in the case of highly conductive alloys. In order to measure the maximum workpiece expansion as well as a net rate of expansion, it is necessary to preset the counter 52 to a value corresponding to a time interval between $T_0$ and $T_3$ which is equal to the preset weld current time. Application of welding power starts the counting sequence of counter 52 which, at count zero, places the amplifier 62 into the hold mode. The resulting amplifier output voltage is proportional to the maximum expansion.

In a third mode of operation, the Z distance between points D and E is determined to provide an indication of forge force or post weld current. The counter 52 is preset to a value equal to the preset weld current time; that is, the time interval between $T_0$ and $T_3$, while the counter 64 is preset to a value equal to the time interval between $T_3$ and $T_4$. At point of time $T_3$, the amplifiers 62 and 66 are placed into the hold mode by the counter 52. The output voltage from the amplifier 62 is an indication of the maximum workpiece expansion. When the maximum expansion point is reached, the workpiece begins to solidify, causing the electrode separation to decrease, with a resulting decrease in the output from the differential transformer 25. At point of time $T_4$, the counter 64 operates to place the amplifier 70 into the hold mode. The output of the amplifier 70 is then at a potential equal to the difference between the potential obtained at points D and E. This output is also displayed on the digital voltmeter 18. It should be understood that this output voltage is correlatable to forge force or post weld current.

Another example of an available mode of operation provides a measurement of an indentation; that is, the $\Delta Z$ distance between the null point $A_2$ and the setdown point F. This operation requires that the counter 52 be preset to a value equal to the time interval between $T_0$ and $T_5$. Upon application of welding power, the amplifier 50 is placed into the hold mode to provide an output proportional to electrode separation at time point $T_0$. The workpiece continues to expand until it reaches the maximum expansion point. When the welding power is cut off, cooling causes the movable electrode to move closer to fixed electrode, with a resulting decrease in the output of the differential transformer 25. This decrease is seen by the output from the amplifier 60 coupled directly to the transformer. Thus, when the amplifier 62 is placed into the hold mode in response to the counter 52 defining a zero count, the output from the amplifier 62 is a potential proportional to the distance between the null point A and the setdown point F.

Although the above-described system employs for each time bracket an analog nulling or baselining arrangement, which comprises a differential amplifier and two sample/hole amplifiers, it will be appreciated by those skilled in the art that only one such baselining arrangement could be arranged to respond to more than one counter by the use of appropriate logic circuitry. Further, it should be understood that replacement of the embodied baselining arrangements or circuits by a programmable calculator or computer which is supplied with the electrical value of each potential by a differential transformer for providing the various weld quality indicators is also possible.

Moreover, it will be appreciated that with the addition of any multiple of the counter and sample/hold amplifier blocks described herein it is possible to add any number of time intervals such as $T_0 - T_1$, $T_1 - T_2$, $T_2 - T_3$, $T_0 - T_3$, $T_0 - T_4$, $T_2 - T_4$, etc., for providing corresponding Z distance intervals.

Still further, although the preferred embodiment of the invention has been described with reference to resistance welding, it should be understood that the same circuit arrangement is applicable to other forms of welding, such as projection, stud, upset, forge, inertial welding and the like. The workpiece or workpieces may be themselves an electrode or electrodes in such processes. In forge welding, friction welding or the like where no electrodes are employed, the curve from which $\Delta T$ increments or time slices are taken comprises the true displacement curve (Z vs. time) of the movable workpiece. Thus, a chosen time bracket produces $\Delta Z$ values whose consistency or change from weld to weld mark the specified consistency of output or a change in some quality of the weld, in the same manner as shown for a resistance weld.

We claim:

1. A method of measuring a plurality of characteristics of a weld during a welding process in which a workpiece is clamped between two welder electrodes, one of which is movable to permit a change in electrode separation due to a dimensional change of the weld in the workpiece during a weld cycle, said method comprising:
    selecting a plurality of predetermined time brackets within an individual weld cycle such that each bracket corresponds to one of the characteristics; and
    measuring the change in electrode separation during each of said time brackets, whereby each measurement represents an indication of a weld characteristic for its corresponding time bracket.

2. A method as defined in claim 1, further comprising selectively varying the starting time and duration of a time bracket in accordance with a desired weld characteristic indication.

3. A method as defined in claim 1, further comprising selecting the beginning of one of said time brackets to occur at the start of the weld cycle, and the end of said one time bracket to occur at the time of maximum dimensional expansion of the weld, whereby the measured change in electrode separation during said one time bracket represents an indication of the maximum size of the weld.

4. A method as defined in claim 1, further comprising selecting one of said time brackets to occur after the maximum dimensional expansion of the weld has occurred during the weld cycle.

5. In a weld monitor system for tracking the separation between a pair of welder electrodes, at least one of which is movable, wherein a workpiece is positioned between the electrodes, and wherein the expansion, melting, contraction and solidification of the weld in the workpiece during a weld cycle causes variation in electrode separation, the improvement comprising:
    means for producing a continuous output potential proportional to electrode separation occurring during a plurality of predetermined time brackets within the weld cycle;
    means for defining a first time bracket of a predetermined duration within the weld cycle;
    means responsive to said output potential for producing a first signal proportional to the change in electrode separation during said first time bracket;
    means for defining a later, second time bracket of a predetermined duration within the weld cycle; and
    means responsive to said output potential for producing a second signal proportional to the change in electrode separation during said second time bracket.

6. The improvement according to claim 5, further comprising:
    means for defining a third predetermined time bracket later than said second time bracket and within the weld cycle; and
    means responsive to said output potential for producing a third signal proportional to the change in electrode separation during said third time bracket, the boundary of said second and third time brackets corresponding to the time of maximum expansion of the weld.

7. The improvement according to claim 5, further comprising first storage means for storing a potential proportional to said output potential at the beginning of said first time bracket; and wherein said first signal-producing means comprises first differential amplifier means, coupled to said output potential-producing means and to said first storage means, for comparing the output potentials at the beginning and end of said first time bracket to produce said first signal as the output of said first differential amplifier means; and further comprising second storage means for storing a potential proportional to said output potential at the beginning of said second time bracket; and wherein said second signal-producing means comprises second differential amplifier means, coupled to said output potential-producing means and to said second storage means, for comparing the output potentials at the beginning and end of said second time bracket to produce said second signal as the output of said second differential amplifier means.

8. The improvement according to claim 7, wherein said means for defining said first and second time brackets comprise first and second presettable interval counter means adapted to be enabled at the starts of said time brackets and to provide outputs at the ends of said time brackets, respectively.

9. The improvement according to claim 8, further comprising third storage means coupled to the outputs of said first and second differential amplifier means and of said first and second counter means for storing said first and second signals at the end of each of said time brackets.

10. The improvement according to claim 9, further comprising a digital voltmeter coupled to said third storage means to provide a digital indication of the stored first and second signals.

* * * * *